(12) United States Patent
Mori (10) Patent No.: US 9,977,705 B2
(45) Date of Patent: *May 22, 2018

(54) WIRELESS COMMUNICATION DEVICE (71) Applicant: Kabushiki Kaisha Toshiba, Minato-ku, Tokyo (JP)

(72) Inventor: Shuzo Mori, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 14/936,225

(22) Filed: Nov. 9, 2015

(65) Prior Publication Data

US 2016/0062813 A1 Mar. 3, 2016

Related U.S. Application Data

(63) Continuation of application No. 14/466,266, filed on Aug. 22, 2014, now Pat. No. 9,210,537.

(30) Foreign Application Priority Data

Mar. 4, 2014 (JP) .................................. 2014-041960

(51) Int. Cl.
*H04B 5/00* (2006.01)
*G06F 11/07* (2006.01)
(Continued)

(52) U.S. Cl.
CPC ...... *G06F 11/0709* (2013.01); *G06F 11/0751* (2013.01); *H04W 4/008* (2013.01); *H04W 88/06* (2013.01)

(58) Field of Classification Search
CPC ....................... G06F 11/0709; G06F 11/0751; H04W 4/008; H04W 88/06
(Continued)

(56) References Cited

U.S. PATENT DOCUMENTS

| 4,686,690 | A | * | 8/1987 | Sato | ........................ | H04L 7/048 |
| | | | | | | 375/365 |
| 5,325,376 | A | * | 6/1994 | Ushio | ...................... | H04Q 9/14 |
| | | | | | | 714/809 |

(Continued)

FOREIGN PATENT DOCUMENTS

| JP | 2009-128943 A | 6/2009 |
| JP | 2011-130062 A | 6/2011 |

(Continued)

*Primary Examiner* — Tan H Trinh
(74) *Attorney, Agent, or Firm* — White & Case LLP (57) ABSTRACT

According to an embodiment, a wireless communication device, which complies with plural communication methods, includes a storing circuit and a received data selection determining circuit. The storing circuit sequentially stores a first received data until the first received data reaches a predetermined data size. When it is assumed that a radio signal complies to a second communication method, a first period is longer than a second period. The first period is a period from a first time when a reception of the radio signal is started to a second time when the first received data with the data size is stored. The second period is a period from the first time to a time when a second reception start signal is detected. The received data selection determining circuit determines a selection of the first received data, when the second reception start signal is not detected at the second time.

20 Claims, 9 Drawing Sheets

(51) Int. Cl.
*H04W 4/00* (2018.01)
*H04W 88/06* (2009.01)

(58) Field of Classification Search
USPC ... 455/69, 522, 13.4, 343.1, 515, 41.1, 41.2,
455/73, 68, 41.3, 559, 558, 150.1, 214,
455/337; 375/148, 364, 334, 332, 114,
375/363; 327/210; 714/755, 794;
348/730; 370/208, 210, 480, 482, 465
See application file for complete search history.

(56) References Cited

U.S. PATENT DOCUMENTS

| | | | | |
|---|---|---|---|---|
| 5,390,365 | A * | 2/1995 | Enoki | H04L 1/20 |
| | | | | 455/226.2 |
| 6,130,602 | A | 10/2000 | O'Toole et al. | |
| 6,236,690 | B1 * | 5/2001 | Mimura | H03D 3/007 |
| | | | | 329/300 |
| 6,256,321 | B1 * | 7/2001 | Kobayashi | H04B 10/272 |
| | | | | 370/464 |
| 6,285,724 | B1 * | 9/2001 | Shimada | H04L 7/0054 |
| | | | | 370/509 |
| 6,301,294 | B1 * | 10/2001 | Hara | H04B 1/7075 |
| | | | | 375/150 |
| 6,359,923 | B1 * | 3/2002 | Agee | H04B 1/69 |
| | | | | 370/342 |
| 6,563,896 | B1 * | 5/2003 | Nomura | H04L 27/2647 |
| | | | | 370/465 |
| 7,505,531 | B1 * | 3/2009 | Pasternak | H04L 1/0041 |
| | | | | 332/103 |
| 8,250,451 | B2 | 8/2012 | Nakamura et al. | |
| 8,537,907 | B2 | 9/2013 | Sung | |
| 8,547,885 | B2 | 10/2013 | Funamoto et al. | |
| 2001/0055320 | A1 * | 12/2001 | Pierzga | H03M 13/6356 |
| | | | | 370/480 |
| 2002/0172056 | A1 | 11/2002 | Riggio et al. | |
| 2002/0191535 | A1 * | 12/2002 | Sugiyama | H04L 1/06 |
| | | | | 370/208 |
| 2005/0210366 | A1 * | 9/2005 | Maehata | H03M 13/1122 |
| | | | | 714/794 |
| 2005/0242860 | A1 * | 11/2005 | Yun | H04N 5/44 |
| | | | | 327/210 |
| 2005/0289432 | A1 * | 12/2005 | Saado | H03M 13/2764 |
| | | | | 714/755 |
| 2006/0170827 | A1 * | 8/2006 | Suda | H03J 1/005 |
| | | | | 348/730 |
| 2008/0049816 | A1 * | 2/2008 | Nakajima | H04L 1/0053 |
| | | | | 375/148 |
| 2008/0054638 | A1 | 3/2008 | Greene et al. | |
| 2011/0241837 | A1 | 10/2011 | Suzuki | |
| 2011/0312364 | A1 * | 12/2011 | Kim | H04W 24/10 |
| | | | | 455/515 |
| 2012/0106219 | A1 | 5/2012 | Okuda | |
| 2012/0135693 | A1 | 5/2012 | Teruyama | |
| 2012/0137310 | A1 | 5/2012 | Teruyama | |
| 2013/0026981 | A1 | 1/2013 | Van Der Lee | |
| 2014/0057575 | A1 | 2/2014 | Ayukawa | |
| 2014/0145515 | A1 | 5/2014 | Jung et al. | |
| 2014/0203660 | A1 | 7/2014 | Adachi | |
| 2015/0189463 | A1 | 7/2015 | Klabunde et al. | |

FOREIGN PATENT DOCUMENTS

| | | |
|---|---|---|
| JP | 2011-175627 A | 9/2011 |
| JP | 2012-118569 A | 6/2012 |
| JP | 2012-118570 A | 6/2012 |

* cited by examiner

(FIRST COMPARATIVE EXAMPLE)

(SECOND COMPARATIVE EXAMPLE)

WIRELESS COMMUNICATION DEVICE

CROSS REFERENCE TO RELATED APPLICATION

This is a Continuation of application Ser. No. 14/466,266, filed on Aug. 22, 2014, which is based upon and claims the benefit of priority from the prior Japanese Patent Application No. 2014-41960 filed on Mar. 4, 2014 in Japan, the entire contents of which are incorporated herein by reference.

FIELD

Embodiments described herein relate generally to a wireless communication device.

BACKGROUND

A wireless communication device that performs a short-distance wireless communication in a noncontact manner is known. There is a possibility that a reception error may occur depending on the communication distance, the state of the antenna, or the characteristic of the demodulator in the wireless communication device described above.

DETAILED DESCRIPTION

According to an embodiment, a wireless communication device is configured to comply with a plurality of communication methods. The wireless communication device includes a rectifying circuit, a first converting circuit, a second converting circuit, a first reception start signal detecting circuit, a second reception start signal detecting circuit, a storing circuit, a received data selection determining circuit, and a receiving circuit. The rectifying circuit is configure to rectify a radio signal received at an antenna. The first converting circuit is configured to sequentially convert an output signal of the rectifying circuit into first received data in a conversion process for a first communication method. The second converting circuit is configured to sequentially convert the output signal of the rectifying circuit into second received data in a conversion process for a second communication method. The first reception start signal detecting circuit is configured to detect a first reception start signal specified in the first communication method from the first received data. The second reception start signal detecting circuit is configured to detect a second reception start signal specified in the second communication method from the second received data. The second reception start signal is longer and more complicated than the first reception start signal. The storing circuit is configured to sequentially store the first received data until the first received data reaches a predetermined data size, after the first reception start signal is detected. When it is assumed that the radio signal complies to the second communication method, a first period is equal to or longer than a second period. The first period is a period from a time when a reception of the radio signal is started to a time when the first received data with the data size is stored. The second period is a period from a time when a reception of the radio signal is started to a time when the second reception start signal is detected. The received data selection determining circuit is configured to determine a selection of the first received data when the second reception start signal is not detected at the time the first received data with the data size is stored in the storing circuit, and determine a selection of the second received data when the second reception start signal is detected. The receiving circuit is configured to receive the first received data or the second received data that is determined in the received data selection determining circuit.

Embodiments will now be explained with reference to the accompanying drawings.

First Embodiment

Figure 1:
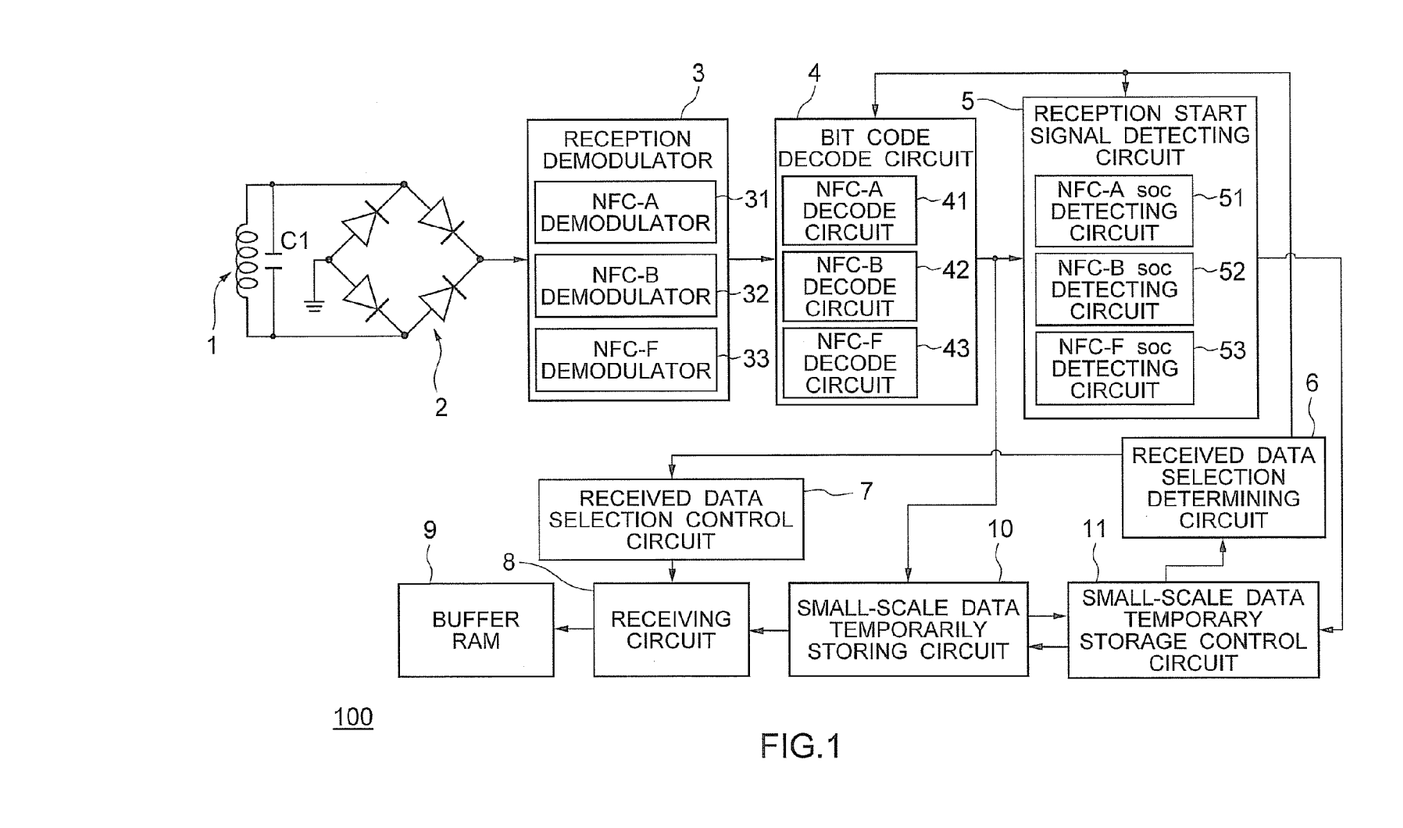
FIG. 1 is a block diagram of a schematic configuration of a wireless communication device according to a first embodiment.

FIG. 1 is a block diagram of a schematic configuration of a wireless communication device 100 according to the first embodiment. The wireless communication device 100 operates in a Card Emulation mode in compliance with the Near Field Communication (NFC) standard. In other words, the wireless communication device 100 complies with a communication method of "Type A" (NFC-A) in ISO/IEC 14443 (a first communication method), a communication method of "Type B" (NFC-B) in ISO/IEC 14443 (a third communication method), and a communication method of "Type F" (NFC-F) in ISO/IEC 18092 (a second communication method).

The communication methods in NFC-A, B and F are also referred to as technologies. The wireless communication device 100 can be embedded, for example, in a mobile phone or a smartphone.

As illustrated in FIG. 1, the wireless communication device 100 includes an antenna 1, a capacitor C1, a rectifying circuit 2, a reception demodulator 3, a Bit Code Decode circuit 4, a reception start signal detecting circuit 5, a received data selection determining circuit 6, a received data selection control circuit 7, a receiving circuit 8, a buffer RAM 9, a small-scale data temporarily storing circuit (hereinafter, referred to as a storing circuit) 10, and a small-scale data temporary storage control circuit (hereinafter, referred to as a storage control circuit) 11.

An antenna 1 is, for example, a coil and receives a radio signal from an external device such as a reader/writer (R/W). The capacitor C1 is connected to both ends of the antenna 1. The rectifying circuit 2 rectifies the radio signal received in the antenna 1. The rectifying circuit 2 includes a bridge diode to which four diodes are connected.

The reception demodulator 3 is an analog circuit and includes an NFC-A demodulator 31, an NFC-B demodulator 32, and an NFC-F demodulator 33. Hereinafter, the NFC-A, B, and F demodulator 31 to 33 may be merely referred to as demodulators 31 to 33.

Each of the demodulators 31 to 33 demodulates (binarizes) the output signal of the rectifying circuit 2 to output the binarized signal. Each of the demodulators 31 to 33 is optimized according to the characteristic of the technology with which each of the demodulators is compatible and performs a waveform processing, for example, using a filter according to the technology with which each of the demodulators is compatible. In other words, the demodulators 31 to 33 may output binarized signals different from each other from the same radio signal.

The bit code decode circuit 4 includes an NFC-A decode circuit 41, an NFC-B decode circuit 42, and an NFC-F decode circuit 43. Hereinafter, the NFC-A, B, and F decode circuits 41 to 43 may be merely referred to as decode circuits 41 to 43. Each of the decode circuits 41 to 43 are designed in compliance with the standard of the technology with which each of the decode circuits is compatible.

The NFC-A decode circuit 41 decodes the binarized signals from the NFC-A demodulator 31 to sequentially convert the binarized signals into received data in NFC-A (first received data).

The NFC-B decode circuit 42 decodes the binarized signals from the NFC-B demodulator 32 to sequentially convert the binarized signals into received data in NFC-B (third received data).

The NFC-F decode circuit 43 decodes the binarized signals from the NFC-F demodulator 33 to sequentially convert the binarized signals into received data in NFC-F (second received data). The received data in NFC-A, B, and F is digital data.

The NFC-A demodulator 31 and the NFC-A decode circuit 41 are included in a first converting circuit. In other words, the first converting circuit sequentially converts the output signal of the rectifying circuit 2 into the received data in NFC-A in a conversion process for the communication method in NFC-A.

The NFC-F demodulator 33 and the NFC-F decode circuit 43 are included in a second converting circuit. In other words, the second converting circuit sequentially converts the output signal of the rectifying circuit 2 into the received data in NFC-F in a conversion process for the communication method in NFC-F.

The NFC-B demodulator 32 and the NFC-B decode circuit 42 are included in a third converting circuit. In other words, the third converting circuit sequentially converts the output signal of the rectifying circuit 2 into the received data in NFC-B in a conversion process for the communication method in NFC-B.

The reception start signal detecting circuit 5 includes an NFC-A reception start signal (soc) detecting circuit (a first reception start signal detecting circuit) 51, and an NFC-B reception start signal (soc) detecting circuit (a third reception start signal detecting circuit) 52, and an NFC-F reception start signal (soc) detecting circuit (a second reception start signal detecting circuit) 53. Hereinafter, the NFC-A, B, and F reception start signal detecting circuits 51 to 53 may be merely referred to as reception start signal detecting circuits 51 to 53.

The reception start signal is defined as Start of Communication (soc) in NFC-A, is defined as Start of Frame (sof) in NFC-B, and is defined as a preamble+sync code in NFC-F. In FIG. 1 and FIGS. 3, 4, and 6 that are to be described below, the "reception start signals" are collectively referred to as the "soc".

The NFC-A reception start signal detecting circuit 51 detects an NFC-A reception start signal (the first reception start signal) specified in the communication method in NFC-A from the received data in NFC-A. The NFC-A reception start signal is a 1-bit "L" (="0").

The NFC-B reception start signal detecting circuit 52 detects an NFC-B reception start signal (the third reception start signal) specified in the communication method in NFC-B from the received data in NFC-B. The NFC-B reception start signal is a 10 to 11-bit "L"+a 2 to 3-bit "H" (="1").

The NFC-F reception start signal detecting circuit 53 detects an NFC-F reception start signal (the second reception start signal) specified in the communication method in NFC-F from the received data in NFC-F.

The NFC-F reception start signal is a preamble+2 byte fixed data (0×B24D). As described above, the NFC-F reception start signal is longer (has a data size larger) than the NFC-A and NFC-B reception start signals, and more complicated than the NFC-A and NFC-B reception start signals.

The storage control circuit 11 controls the storing circuit 10 according to the detection information about the reception start signal of each of the technologies from the reception start signal detecting circuit 5. The storage control circuit 11 controls the received data selection determining circuit 6 according to the storage result from the storing circuit 10 and the detection information from the reception start signal detecting circuit 5.

After detecting the NFC-A reception start signal, the storing circuit 10 sequentially stores the received data in NFC-A until it reaches a predetermined data size, according to the control of the storage control circuit 11. The storing circuit 10 may store the received data in NFC-A after suspending for a one-bit time of the received data after the detection of the NFC-A reception start signal. After the detection of the NFC-B reception start signal, the storing circuit 10 sequentially stores the received data in NFC-B until the received data in NFC-B reaches the above data size. The storing circuit 10 notifies the storage result to the storage control circuit 11 when the received data in NFC-A or B with the above data size is stored.

When the NFC-F reception start signal is not detected at the time the received data in NFC-A with the above data size is stored in the storing circuit 10 according to the control of the storage control circuit 11, the received data selection determining circuit 6 determines the selection of the received data in NFC-A. When determining the selection of the received data in NFC-A, the received data selection determining circuit 6 may stop the operations of the NFC-B and F decode circuits 42 and 43, and the NFC-B and F reception start signal detecting circuits 52 and 53. This can reduce the power consumption.

When the NFC-F reception start signal is not detected at the time the received data in NFC-B with the above data size is stored in the storing circuit 10, the received data selection determining circuit 6 determines the selection of the received data in NFC-B. When determining the selection of the received data in NFC-B, the received data selection determining circuit 6 may stop the operations of the NFC-A and F decode circuits 41 and 43, and the NFC-A and F reception start signal detecting circuits 51 and 53.

On the other hand, when the reception start signal in NFC-F is detected, the received data selection determining circuit 6 determines the selection of the received data in NFC-F regardless of whether the NFC-A or B reception start signal is detected. When determining the selection of the received data in NFC-F, the received data selection determining circuit 6 may stop the operations of the NFC-A and B decode circuits 41 and 42, and the NFC-A and B reception start signal detecting circuits 51 and 52.

The received data selection control circuit 7 controls the selection of the received data in the receiving circuit 8 according to the determination result from the received data selection determining circuit 6.

The receiving circuit 8 receives the received data in NFC-A, the received data in NFC-B, or the received data in NFC-F that is determined in the received data selection determining circuit 6 through the storing circuit 10. Specifically, the receiving circuit 8 sequentially holds the determined received data in NFC-A, B, or F to output the data per predetermined unit data size to the buffer RAM 9.

The buffer RAM 9 stores the received data in NFC-A, B, or F from the receiving circuit 8 per unit data size. In other words, the buffer RAM 9 is configured to store the received data in one of the technologies. This can reduce the cost because it is not necessary to provide a plurality of buffer RAMs 9.

Hereinafter, the data size in the storing circuit 10 will be described. When the radio signal in NFC-F is converted into the received data in NFC-A in the NFC-A demodulator 31 and the NFC-A decode circuit 41, there is a possibility that the NFC-A reception start signal detecting circuit 51 may determine that the preamble in NFC-F is not modulated ("H") and determine that the neighborhood of the top of the following fixed data in NFC-F (0×B24D) is "L". Thus, there is a possibility that the NFC-A reception start signal detecting circuit 51 may mistakenly detect an NFC-A reception start signal.

When the radio signal in NFC-F is converted into the received data in NFC-B in the NFC-B demodulator 32 and the NFC-B decode circuit 42, there is a possibility that the NFC-B reception start signal detecting circuit 52 may determine that the preamble in NFC-F is "L" and determine that the neighborhood of the top of the following fixed data in NFC-F is "H". Thus, there is a possibility that the NFC-B reception start signal detecting circuit 52 may mistakenly detect an NFC-B reception start signal.

In the detection errors described above, the timing the NFC-A reception start signal is mistakenly detected is almost the same as the timing the NFC-B reception start signal is mistakenly detected because the initial communications in NFC-A and B start at a communication speed of 106 kbps. The timings are the timing of the neighborhood of the top of the fixed data in NFC-F.

The initial communication in NFC-F starts at a communication speed of 212 kbps or 424 kbps. Accordingly, 2-byte fixed data in NFC-F (0×B24D) received at 212 kbps can be received in a period of time corresponding to a period of time in which 1-byte data is received at 106 kbps. The 2-byte fixed data received at 424 kbps can be received in a period of time corresponding to a period of time in which 0.5-byte data is received at 106 kbps.

In light of the foregoing, the above data size is preferably seven bits or more when the received data is stored in NFC-A after suspending for a 1-bit time (when the time is adjusted), and is preferably eight bits or more when the received data is stored in NFC-A without the time adjustment or when the received data is stored in NFC-B. Hereinafter, for clarification, the description is on the assumption that the above data size is one byte.

In other words, when it is assumed that the radio signal complies with NFC-F, a first period and a third period are equal to or longer than a second period. The first period is the period from the time when the reception of the radio signal is started to the time when the received data in NFC-A with the above data size is stored. The third period is the period from the time when the reception of the radio signal is started to the time when the received data in NFC-B with the above data size is stored. The second period is the period from the time when the reception of the radio signal is started to the time when the reception start signal in NFC-F is detected.

Figure 2:
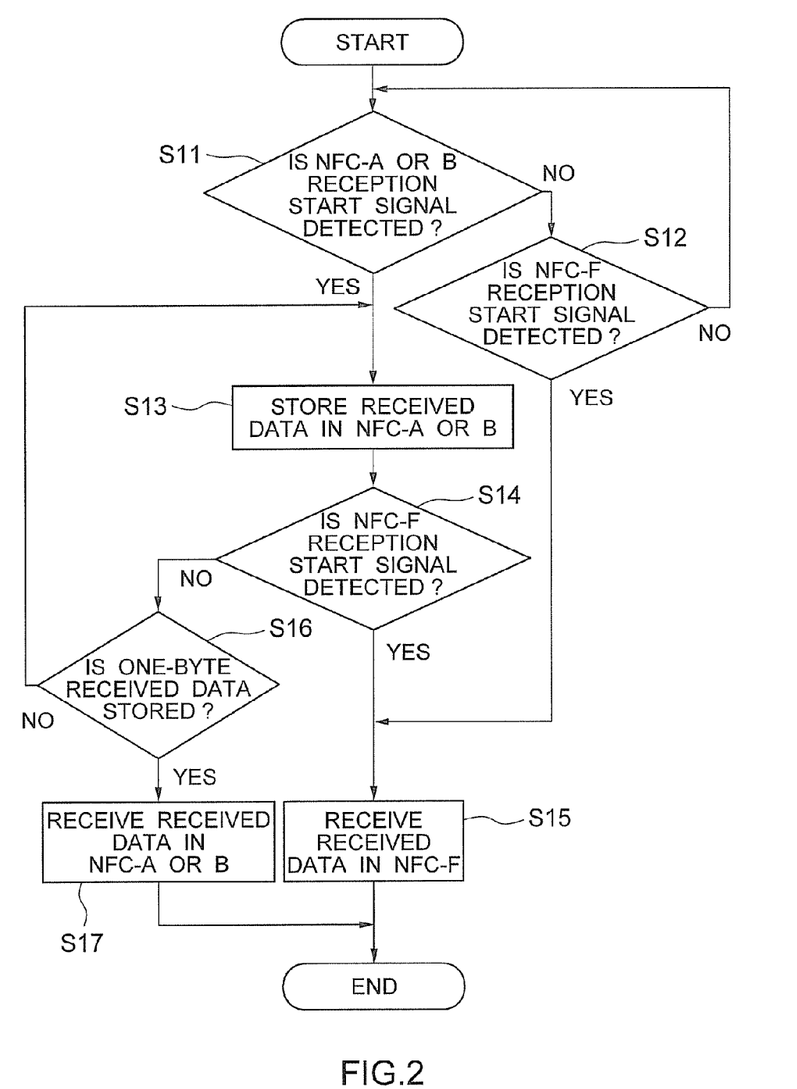
FIG. 2 is a flowchart describing an operation of the wireless communication device illustrated in FIG. 1.

FIG. 2 is a flowchart describing an operation of the wireless communication device 100 illustrated in FIG. 1.

When the wireless communication device 100 start operating, the demodulators 31 to 33, the decode circuits 41 to 43, and the reception start signal detecting circuits 51 to 53 operate so as to receive the radio signal in any technology.

In the state, it is first determined whether the reception start signal detecting circuit 5 detects an NFC-A or B reception start signal (step S11). When the reception start signal detecting circuit 5 does not detect an NFC-A or B reception start signal (No in step S11), it is determined whether the reception start signal detecting circuit 5 detects an NFC-F reception start signal (step S12).

When the reception start signal detecting circuit 5 does not detect an NFC-F reception start signal (No in step S12), the process returns to step S11. On the other hand, when the reception start signal detecting circuit 5 detects an NFC-F reception start signal (Yes in step S12), the process goes to step S15 to be described below.

When the reception start signal detecting circuit 5 detects an NFC-A or B reception start signal in step S11 (Yes in step S11), the storing circuit 10 stores the received data in NFC-A or B of which reception start signal is detected (step S13).

Next, it is determined whether the reception start signal detecting circuit 5 detects an NFC-F reception start signal (step S14). When the reception start signal detecting circuit 5 detects the NFC-F reception start signal (Yes in step S14), the receiving circuit 8 receives the received data in NFC-F (step S15). Specifically, the receiving circuit 8 sequentially holds the received data in NFC-F to output the data per unit data size to the buffer RAM 9. When the reception of the received data is completed, the process is terminated.

On the other hand, when the reception start signal detecting circuit 5 does not detect an NFC-F reception start signal in step S14 (No in step S14), it is determined whether the storing circuit 10 stores one-byte received data in NFC-A or B (step S16).

When the storing circuit 10 does not store one-byte received data in NFC-A or B (No in step S16), the process returns to step S13 to continuously store the received data in NFC-A or B.

When the storing circuit 10 stores one-byte received data in NFC-A or B (Yes in step S16), the receiving circuit 8 receives the received data in NFC-A or B of which reception start signal is detected (step S17). Specifically, the receiving circuit 8 sequentially holds the 1-byte received data in NFC-A or B that is stored in the storing circuit 10, and the converted received data in NFC-A or B following the received data to output the data per unit data size to the buffer RAM 9. When the reception of the received data is completed, the process is terminated.

As described above, according to the present embodiment, after the NFC-A or B reception start signal is detected, when the NFC-F reception start signal is not detected at the time the 1-byte received data in NFC-A or B is stored in the storing circuit 10, the received data in NFC-A or B is received. In other words, when the NFC-A or B reception start signal is detected, the reception of the received data in NFC-A or B is not immediately started and suspended until the time in which the NFC-F reception start signal may be detected is elapsed. On the other hand, when the NFC-F reception start signal is detected, the reception of the received data in NFC-F is immediately started.

Thus, the received data in NFC-F is normally received when an NFC-F reception start signal is detected even after an NFC-F reception start signal is mistakenly detected as an NFC-A or B reception start signal. An NFC-F reception start signal is less likely to mistakenly be detected because being longer than the NFC-A and B reception start signals and more complicated than the NFC-A and B reception start signals.

This reduces the possibility that the data is received in a wrong technology. This can reduce the possibility of reception error.

In other words, this can implement the operation in a card emulation mode with a high percentage of correct answers at a low cost. This can improve the stability in the communication in NFC with a mobile phone or smartphone provided with the wireless communication device 100.

Note that the NFC-A demodulator 31 and NFC-B demodulator 32 can be shared. The shared demodulator is optimized according to the characteristics of NFC-A and B. In such a case, the NFC-A decode circuit 41 decodes the binarized signals from the shared demodulator and converts the signals into the received data in NFC-A. The NFC-B decode circuit 42 decodes the binarized signals from the shared demodulator and converts the signals into the received data in NFC-B.

First Comparative Example

Hereinafter, a first comparative example will be described in comparison with the first embodiment.

Figure 3:
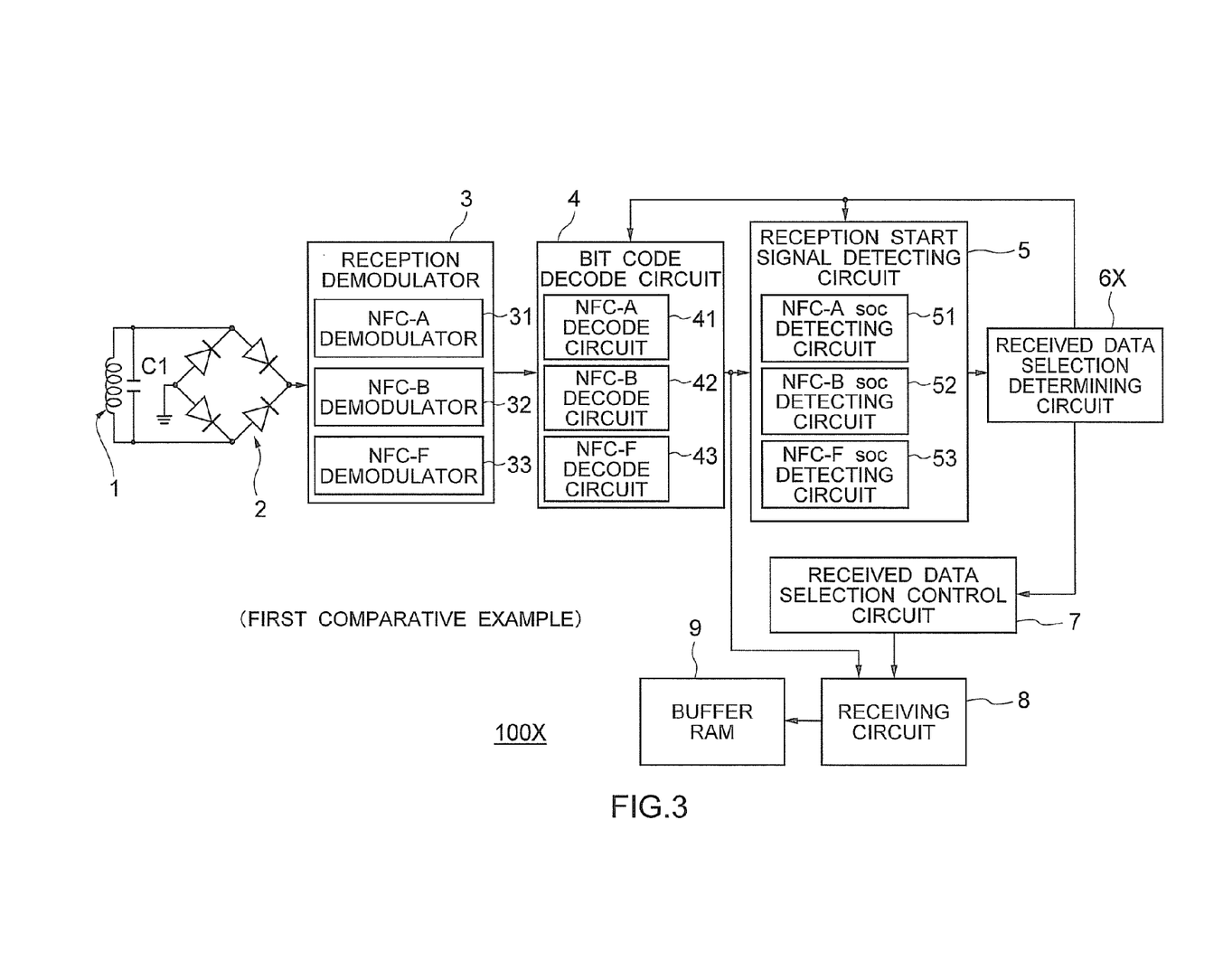
FIG. 3 is a block diagram of a schematic configuration of a wireless communication device of a first comparative example.

FIG. 3 is a block diagram of a schematic configuration of a wireless communication device 100X of the first comparative example. Differently from the first embodiment, the wireless communication device 100X does not include a storing circuit 10 and a storage control circuit 11. The same components as in FIG. 1 are denoted with the same reference signs in FIG. 3. Hereinafter, the different points will mainly be described.

A received data selection determining circuit 6X determines the selection of the received data in the technology that the reception start signal detecting circuit 5 initially notifies, and notifies the determination result to the received data selection control circuit 7. Furthermore, the received data selection determining circuit 6X stops the operation of the circuit of which technology is not determined among decode circuits 41 to 43 and reception start signal detecting circuits 51 to 53.

The wireless communication device 100X of the first comparative example as described above has a possibility of mistakenly determining the NFC-F reception start signal as an NFC-A or B reception start signal depending on the communication distance, the state of an antenna 1 or the characteristics of demodulators 31 and 32. The simplicity of the NFC-A and B reception start signals is likely to cause such a determination error. In addition, the NFC-A and B demodulators 31 and 32 may be configured to output binarized signals obtained by processing the waveform of the output signal of the rectifying circuit 2 by restraining, for example, the frequency component according to the standards of NFC-A and B. This is likely to cause a determination error because the binarized signal, in which the radio signal in NFC-F is binarized in the NFC-A and B demodulators 31 and 32, may have a waveform similar to the waveform indicating the NFC-A or B reception start signal.

Furthermore, as described above, the timing at which an NFC-A or B reception start signal is determined is earlier than the timing at which an NFC-F reception start signal is determined. When an NFC-A or B reception start signal is detected earlier, the NFC-F decode circuit 43 and the NFC-F reception start signal detecting circuit 53 stops operating. Thus, even if the radio signal in NFC-F is actually received, an NFC-F reception start signal is not detected after a determination error occurs. The wrong NFC-A or B demodulator 31 or 32 or the like does not obtain correct received data from the radio signal in NFC-F. This causes a reception error.

In the case described above, an answer is not sent back to the reader/writer that sends the radio signal to the wireless communication device 100X. This reduces the percentage of correct answers to the commands from the reader/writer.

Furthermore, the CPU (not illustrated) checks the validity of the received data stored in the buffer RAM 9 and, once confirming that the data is not valid, discards the received data. This increases the load on the CPU. Furthermore, the received data is not received while the CPU checks the validity.

Providing a plurality of buffer RAMs 9 to store the received data in a plurality of technologies can solve the problems described above but increases the cost drastically.

As described above, the first embodiment can solve such problems.

Second Embodiment

Figure 4:
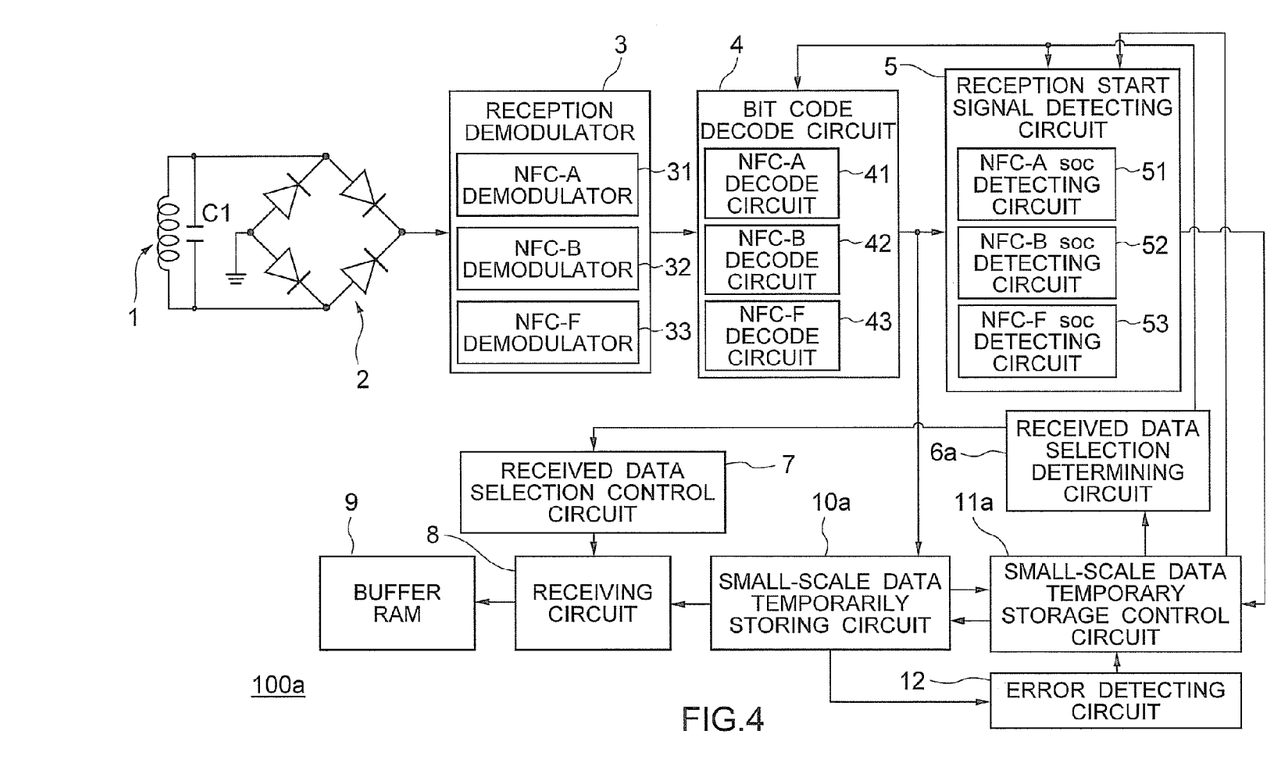
FIG. 4 is a block diagram of a schematic configuration of a wireless communication device according to a second embodiment.

The second embodiment is configured to detect an error in the received data stored in the storing circuit 10a in addition to the process in the first embodiment.

FIG. 4 is a block diagram of a schematic configuration of a wireless communication device 100a according to the second embodiment. The same components as in FIG. 1 are denoted with the same reference signs in FIG. 4. Hereinafter, the different points will mainly be described. The wireless communication device 100a further includes an error detecting circuit 12 in addition to the configuration in FIG. 1.

When detecting an error from the received data in NFC-A or B stored in a storing circuit 10a, the error detecting circuit 12 causes a receiving circuit 8 to delete the received data stored in the storing circuit 10a without receiving the received data in NFC-A or B and causes a reception start signal detecting circuit 5 to detect an NFC-A or B reception start signal again.

Specifically, when detecting an error, the error detecting circuit 12 notifies an error detection result to a storage control circuit 11a. After receiving the error detection result, the storage control circuit 11a controls a received data selection determining circuit 6a, the storing circuit 10a, and the reception start signal detecting circuit 5.

The error can be detected under any condition. However, in the present embodiment, the error detecting circuit 12 detects an error when the received data in NFC-A or B stored in the storing circuit 10a does not correspond to an expected value.

The expected value is not especially limited. For example, the following expected values can be used. In NFC-A and B, the command to be received after the reception start signal can be limited. The command is "REQA" or "WUPA" in NFC-A, "REQB" or "WUPB" in NFC-B. Accordingly, the expected value is 0×26, 0×52, or 0×35 corresponding to the commands in NFC-A, and is 0×05 in NFC-B. The expected values have seven bits or eight bits.

Figure 5:
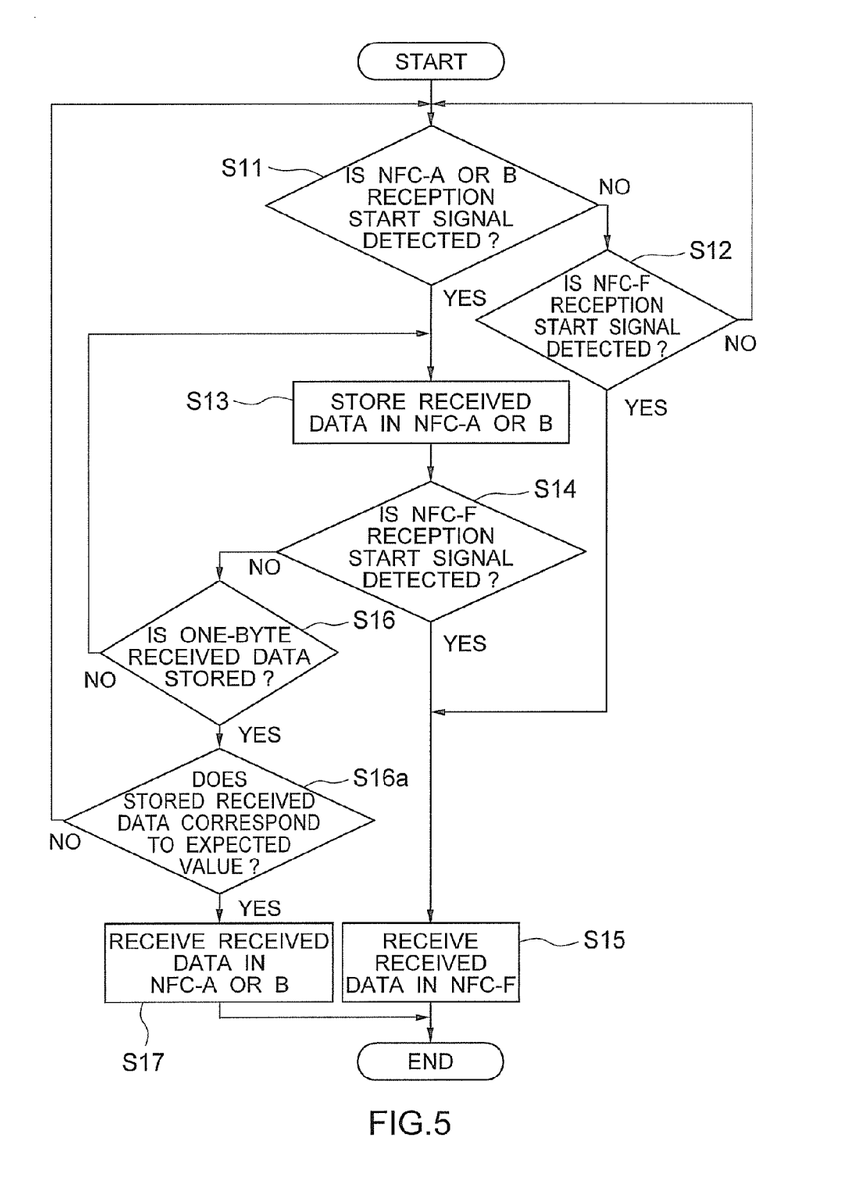
FIG. 5 is a flowchart describing an operation of the wireless communication device in FIG. 4.

FIG. 5 is a flowchart describing the operation of the wireless communication device 100a in FIG. 4. The same components as in FIG. 2 are denoted with the same reference signs in FIG. 5. Hereinafter, the different points will mainly be described.

The processes in steps S11 to 16 are the same as in the first embodiment.

When the storing circuit 10a stores 1-byte received data in NFC-A or B (Yes in step S16), the error detecting circuit 12 determines whether the received data in NFC-A or B stored in the storing circuit 10a corresponds to the expected value (step S16a).

When the data corresponds to the expected value (Yes in step S16a), the receiving circuit 8 receives the received data in NFC-A or B of which reception start signal is detected (step S17).

When the data does not correspond to the expected value (No in step S16a), the process returns to step S11.

As described above, in addition to the process in the first embodiment, the present embodiment is configured to detect an NFC-A or B reception start signal again when an error is detected from the received data in NFC-A or B stored in the storing circuit 10a. This further reduces the possibility of receiving the data in a wrong technology in comparison with the first embodiment and can further reduce the possibility of reception error.

Note that the error detecting circuit 12 can detect an error, for example, when detecting a reception end signal (eoc: End of Communication) before the storage of the received data with a predetermined data size is completed. The reception end signal is, for example, continuous signals "L". In the case described above, the received data may not reach one byte. When detecting an error, the error detecting circuit 12 can cause the storing circuit 10a to delete the stored received data and to suspend the storage of the received data. The error detecting circuit 12 can also detect an error from the received data in NFC-A or B that is from a decode circuit 4 and that is not stored in the storing circuit 10a.

The error detecting circuit 12 can also detect an error, for example, when a radio signal with a waveform indicating bit coding different from each of the technologies is input to the reception demodulator 3. In other words, as described above, the condition for detecting an error is not limited to the mismatch between the data and the expected value or the detection of a reception end signal.

Setting the data size at a size larger than one byte can improve the accuracy of detection of errors.

Third Embodiment

The second embodiment receives the received data in NFC-A or B when a period in which an NFC-F reception start signal is likely to be detected elapses and an error is not detected. However, differently from the second embodiment, the third embodiment does not wait for the elapse of the period in which an NFC-F reception start signal is likely to be detected.

Figure 6:
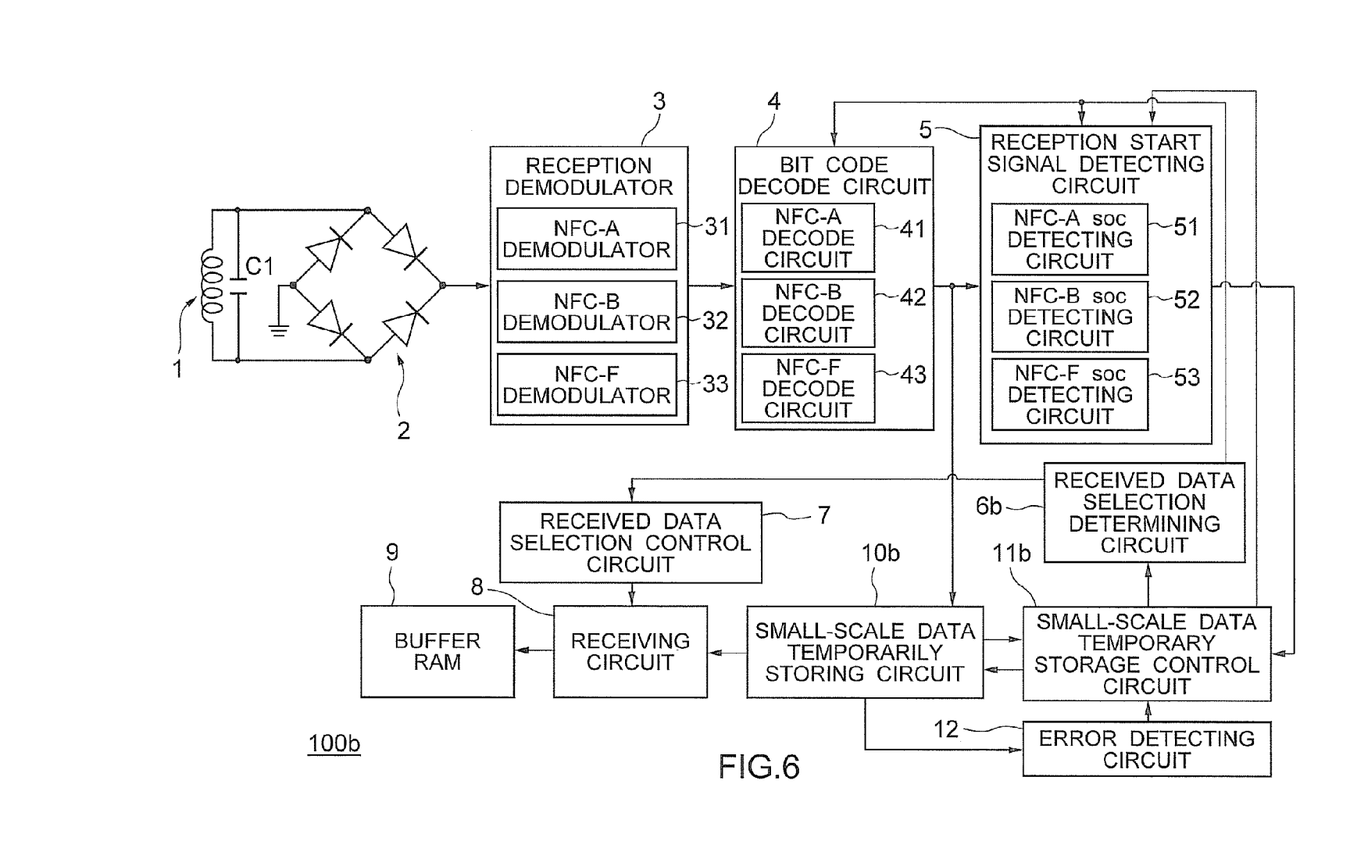
FIG. 6 is a block diagram of a schematic configuration of a wireless communication device according to a third embodiment.

FIG. 6 is a block diagram of a schematic configuration of a wireless communication device 100b according to the third embodiment. The same components as in FIG. 4 are denoted with the same reference signs in FIG. 6. Hereinafter, the different points will mainly be described.

The data size of the received data stored in the storing circuit 10b satisfies the following condition. In other words, on the assumption that the radio signal complies with NFC-F, a first period and a third period are shorter than a second period. The first period is the period from the time when the reception of the radio signal is started to the time when the received data in NFC-A with the above data size is stored. The third period is the period from the time when the reception of the radio signal is started to the time when the received data in NFC-B with the above data size is stored. The second period is the period from the time when the reception of the radio signal is started to the time when an NFC-F reception start signal is detected.

The data size described above is, for example, less than one byte. When the data size is equal to or more than one byte, the same process as in the second embodiment is performed.

The error detecting circuit 12 detects an error from the received data in NFC-A or B stored in the storing circuit 10b. The method of detecting an error is the same as in the second embodiment. However, when an expected value is used, an expected value with less than one byte is used.

A received data selection determining circuit 6b determines the selection of the received data in NFC-A when the error detecting circuit 12 does not detect an error at the time the received data in NFC-A with the above data size is stored in the storing circuit 10b.

Furthermore, the received data selection determining circuit 6b determines the selection of the received data in NFC-B when the error detecting circuit 12 does not detect an error at the time the received data in NFC-B with the above data size is stored in the storing circuit 10b.

Alternatively, the received data selection determining circuit 6b determines the selection of the received data in NFC-F when an NFC-F reception start signal is detected.

When detecting an error, the error detecting circuit 12 causes the receiving circuit 8 to delete the received data stored in the storing circuit 10b without receiving the received data in NFC-A or B and causes the reception start signal detecting circuit 5 to detect an NFC-A or B reception start signal again.

Specifically, when detecting an error, the error detecting circuit 12 notifies an error detection result to the storage control circuit 11b. After receiving the error detection result, the storage control circuit 11b controls the storing circuit 10b, and the reception start signal detecting circuit 5.

The present embodiment is configured to detect an error of the received data without immediately starting the reception of the received data in NFC-A or B when an NFC-A or B reception start signal is detected. On the other hand, the present embodiment immediately receives the received data in NFC-F when an NFC-F reception start signal is detected.

This can prevent the reception of the received data in NFC-A or B when an NFC-A or B reception start signal is mistakenly detected and an error is detected from the received data. After that, when an NFC-F reception start signal is detected, the received data in NFC-F can normally be received.

This reduces the possibility that the data is received in a wrong technology. This can reduce the possibility of reception error.

Fourth Embodiment

Figure 7:
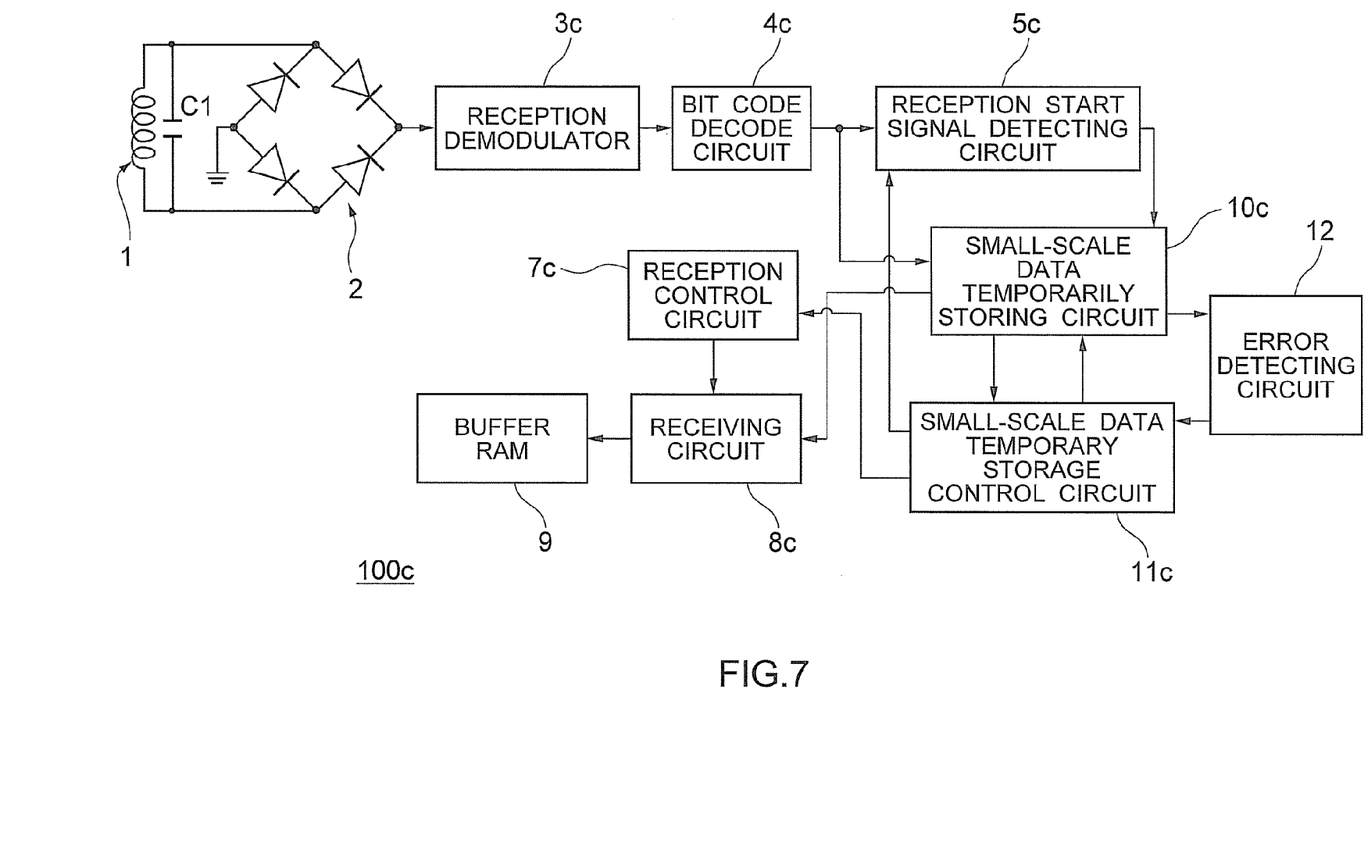
FIG. 7 is a block diagram of a schematic configuration of a wireless communication device according to a fourth embodiment.

The fourth embodiment relates to a wireless communication device 100c in which a receivable technology is determined in advance.

FIG. 7 is a block diagram of a schematic configuration of a wireless communication device 100c according to the fourth embodiment. The same components as in FIG. 1 are denoted with the same reference signs in FIG. 7. Hereinafter, the different points will mainly be described.

In the present embodiment, an example in which the wireless communication device 100c complies with NFC-A will be described. However, the wireless communication device 100c may comply with NFC-B. The wireless communication device 100c described above is also referred to, for example, as a non-contact IC card, or an RF-IC CARD.

A reception demodulator 3c demodulates the output signal of a rectifying circuit 2 to output binarized signals. A bit code decode circuit 4c decodes the binarized signals from the reception demodulator 3c to convert the signals into the received data in NFC-A. The reception demodulator 3c and the bit code decode circuit 4c are optimized according to the characteristic of NFC-A. The reception demodulator 3c and the bit code decode circuit 4c are constituted as a converting circuit. In other words, the converting circuit sequentially converts the output signal of the rectifying circuit 2 into the received data in NFC-A in a conversion process for the communication method in NFC-A.

The reception start signal detecting circuit 5c detects a predetermined NFC-A reception start signal from the received data in NFC-A and notifies the detection information to the storing circuit 10c.

After the NFC-A reception start signal is detected, the storing circuit 10c sequentially stores the received data in NFC-A until the data reaches a predetermined data size. In the case described above, the data size is one byte. However, the data size can be less than one byte or larger than one byte.

An error detecting circuit 12 detects an error from the received data stored in the storing circuit 10c. In the present embodiment, the error detecting circuit 12 detects an error when the one-byte received data stored in the storing circuit 10c does not correspond to an expected value.

When detecting an error, the error detecting circuit 12 prevents a receiving circuit 8c from receiving the received data, causes the storing circuit 10c to delete the received data stored and causes the reception start signal detecting circuit 5c to detect the reception start signal again.

Specifically, the storage control circuit 11c controls the reception start signal detecting circuit 5c and the reception control circuit 7c according to the error detection result from the error detecting circuit 12.

The receiving circuit 8c receives the received data in NFC-A according to the control of the reception control circuit 7c, when the error detecting circuit 12 does not detect an error at the time the received data with the above data size is stored in the storing circuit 10c.

Figure 8:
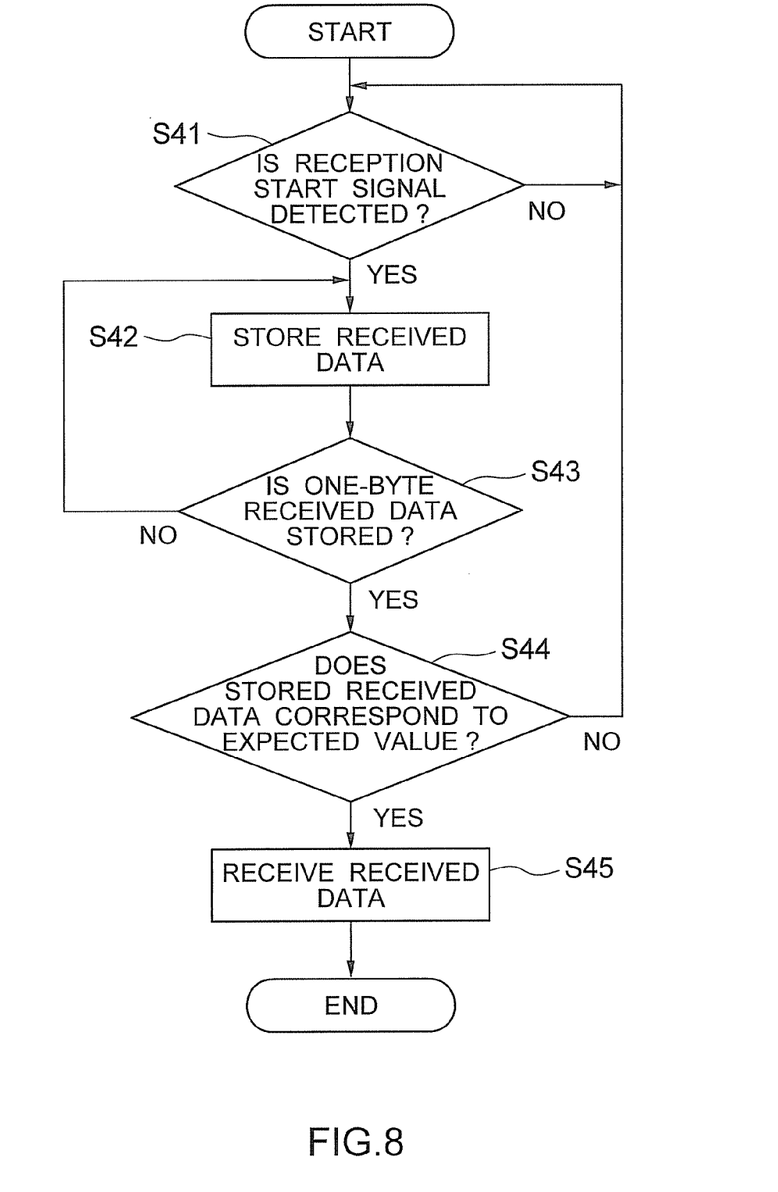
FIG. 8 is a flowchart describing an operation of the wireless communication device in FIG. 7.

FIG. 8 is a flowchart describing the operation of the wireless communication device in FIG. 7.

First, it is determined whether the reception start signal detecting circuit 5c detects an NFC-A reception start signal (step S41). When the reception start signal detecting circuit 5c does not detect the reception start signal (No in step S41), the process returns to step S41.

When the reception start signal detecting circuit 5c detects the reception start signal (Yes in step S41), the storing circuit 10c stores the received data in NFC-A (step S42).

It is determined whether the storing circuit 10c stores one-byte received data (step S43). When the storing circuit 10c does not store one-byte received data (No in step S43), the process returns to step S42.

When the storing circuit 10c stores one-byte received data (Yes in step S43), the error detecting circuit 12 determines whether the received data stored in the storing circuit 10c corresponds to the expected value (step S44).

When the stored received data corresponds to the expected value (Yes in step S44), the receiving circuit 8c receives the received data (step S45). Specifically, the receiving circuit 8c sequentially holds the one-byte received data stored in the storing circuit 10c and the received data following the received data to output the data per unit data size to a buffer RAM 9.

On the other hand, when the stored received data does not correspond to the expected value (No in step S44), the process returns to step S41. As an example of the case described above, in which a radio signal in NFC-F or a noise is received can be cited.

As described above, the present embodiment is configured to receive the received data when the error detecting circuit 12 does not detect an error at the time the received data stored in the storing circuit 10c reaches one byte after the reception start signal is detected. This can reduce the possibility of reception error because merely detecting a reception start signal is not enough to receive the received data.

Note that, as described in the second embodiment, the error detecting circuit 12 may detect an error, for example, when detecting a reception end signal.

Second Comparative Example

Hereinafter, the second comparative example will be described in comparison with the fourth embodiment.

Figure 9:
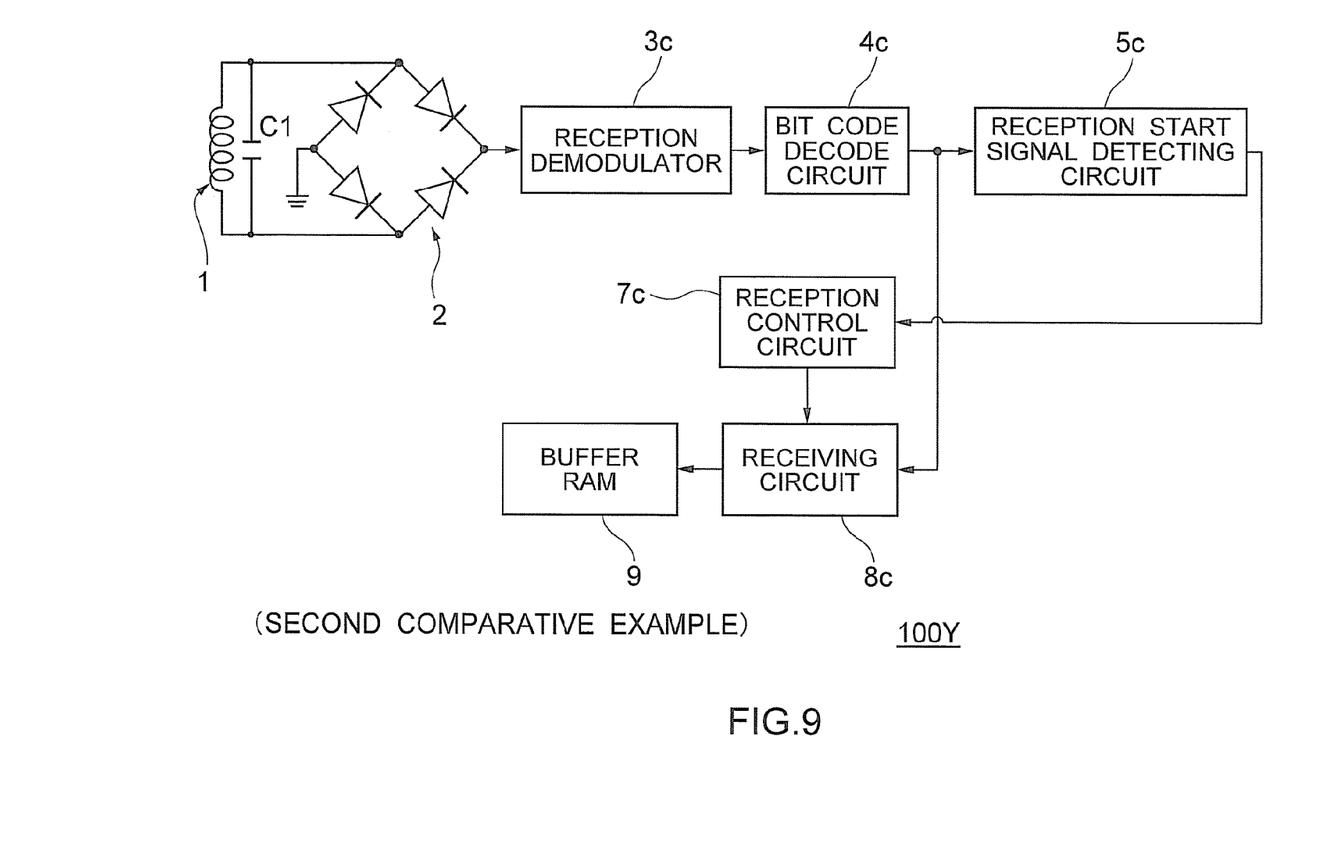
FIG. 9 is a block diagram of a schematic configuration of a wireless communication device of a second comparative example.

FIG. 9 is a block diagram of a schematic configuration of a wireless communication device 100Y of the second comparative example. Differently from the fourth embodiment, the wireless communication device 100Y does not include a storing circuit 10c, a storage control circuit 11c, and an error detecting circuit 12. The same components as in FIG. 7 are denoted with the same reference signs in FIG. 9. Hereinafter, the different points will mainly be described.

When a reception start signal detecting circuit 5c detects an NFC-A reception start signal, a reception control circuit 7c immediately causes a receiving circuit 8c to receive the received data.

The wireless communication device 100Y of the second comparative example as described above has a possibility of mistakenly determining an NFC-F reception start signal or a noise as the NFC-A reception start signal depending on the communication distance, the state of an antenna 1 or the characteristic of a reception demodulator 3c. This causes a reception error because correct received data is not obtained. This causes a problem, for example, of the increase in the load of the CPU, similarly to the first comparative example. As described above, the fourth embodiment can solve such a problem.

At least a portion of the wireless communication device described in the above embodiments may be constituted by hardware or software. In the software configuration, a program realizing at least a portion of the functions of the wireless communication device is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the wireless communication device may be distributed through a communication line (including wireless communication) such as the Internet. While the program is encrypted, modulated, or compressed, the program may be distributed through a wired line or a wireless line such as the Internet, or the program stored in a recording medium may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a first converting circuit configured to decode a signal inputted from an external using a first communication method and to generate first received data;
   a second converting circuit configured to decode a signal inputted from the external using a second communication method and to generate second received data;
   a first reception start signal detecting circuit configured to receive the first received data and to detect a first reception start signal specified in the first communication method;
   a second reception start signal detecting circuit configured to receive the second received data and to detect a second reception start signal specified in the second communication method;
   a storing circuit configured to store the first received data in response to detection information outputted from the first reception start signal detecting circuit;
   a received data selection determining circuit configured to determine a selection of the second received data only when the second reception start signal detecting circuit outputs detection information;
   a receiving circuit configured to receive the first received data, that is outputted from the storing circuit, or the second received data.

2. The wireless communication device according to claim 1, further comprising:
   an error detecting circuit configured to detect an error in the first received data.

3. The wireless communication device according to claim 2,
   wherein the first reception start signal detecting circuit detects the first reception start signal again in response to error detection signal outputted from the error detecting circuit.

4. The wireless communication device according to claim 2,
   wherein the error detecting circuit compares the first received data with an expected value.

5. The wireless communication device according to claim 2,
   wherein the error detecting circuit compares the first received data with a reception end signal.

6. The wireless communication device according to claim 1,
   wherein the received data selection determining circuit stops an operation of the first reception start signal detecting circuit when determining a selection of the second received data.

7. The wireless communication device according to claim 6,
   wherein the storing circuit stores the first received data until the first received data reaches a predetermined data size.

8. The wireless communication device according to claim 7,
   wherein the first communication method is a communication method of Type A in ISO/IEC 14443,
   the second communication method is a communication method of Type F in ISO/IEC 18092,
   the data size is equal to or more than seven bits, and
   the second reception start signal is longer and more complicated than the first reception start signal.

9. A wireless communication device comprising:
   a first converting circuit configured to decode a signal inputted from an external using a first communication method and to generate first received data;
   a second converting circuit configured to decode a signal inputted from the external using a second communication method and to generate second received data;
   a third converting circuit configured to decode a signal inputted from the external using a third communication method and to generate third received data;
   a first reception start signal detecting circuit configured to receive the first received data and to detect a first reception start signal specified in the first communication method;
   a second reception start signal detecting circuit configured to receive the second received data and to detect a second reception start signal specified in the second communication method;
   a third reception start signal detecting circuit configured to receive the third received data and to detect a third reception start signal specified in the third communication method;
   a storing circuit configured to store the first received data or the third received data in response to detection information outputted from the first reception start signal detecting circuit or in response to detection information outputted from the third reception start signal detecting circuit;
   a received data selection determining circuit configured to determine a selection of the second received data only when the second reception start signal detecting circuit outputs detection information;
   a receiving circuit configured to receive any one of the first received data, that is outputted from the storing circuit, the third received data, that is outputted from the storing circuit, or the second received data.

10. The wireless communication device according to claim 9, further comprising:
    an error detecting circuit configured to detect an error in the first received data or the second received data.

11. The wireless communication device according to claim 10,
    wherein the first and third reception start signal detecting circuits respectively detect the first and third reception start signals again in response to error detection signal outputted from the error detecting circuit.

12. The wireless communication device according to claim 10,
    wherein the error detecting circuit compares the first received data with a first expected value and compares the third received data with a second expected value.

13. The wireless communication device according to claim 10, wherein the error detecting circuit compares the first received data with a first reception end signal and compares the third received data with a second reception end signal.

14. The wireless communication device according to claim 13,
wherein the first expected value is 0×26, 0×52, or 0×35 corresponding to the commands in NFC-A,
the second expected value is 0×05 corresponding to the commands in NFC-B.

15. The wireless communication device according to claim 9,
wherein the received data selection determining circuit stops an operation of the first and third reception start signal detecting circuits when determining a selection of the second received data.

16. The wireless communication device according to claim 15,
Wherein the storing circuit stores the first received data until the first received data reaches a predetermined data size.

17. The wireless communication device according to claim 16,
wherein the first communication method is a communication method of Type A in ISO/IEC 14443,
the second communication method is a communication method of Type F in ISO/IEC 18092,
the third communication method is a communication method of Type B in ISO/IEC 14443,
the data size is equal to or more than seven bits, and
the second reception start signal is longer and more complicated than the first reception start signal.

18. A wireless communication device comprising:
a converting circuit configured to decode a signal inputted from an external and to generate received data;
a reception start signal detecting circuit configured to receive the received data and to detect a predetermined reception start signal;
a storing circuit configured to store the received data until the received data reaches a predetermined data size in response to detection information outputted from the reception start signal detecting circuit;
an error detecting circuit configured to detect an error in the received data;
a receiving circuit configured to receive the received data in response to the error that is detected by the error detecting circuit wherein,
when the error detecting circuit does not detect an error at the time the received data with the data size is stored in the storing circuit, the receiving circuit receives the received data, and
when detecting an error, the error detecting circuit prevents the receiving circuit from receiving the received data.

19. The wireless communication device according to claim 18,
wherein the error detecting circuit detects an error when the received data stored in the storing circuit does not correspond to an expected value.

20. The wireless communication device according to claim 19,
wherein the storing circuit stores the received data until the received data reaches a predetermined data size,
the data size is equal to or more than seven bits,
the wireless communication device uses a communication method of Type A or Type B in ISO/IEC 14443.

* * * * *